UNITED STATES PATENT OFFICE.

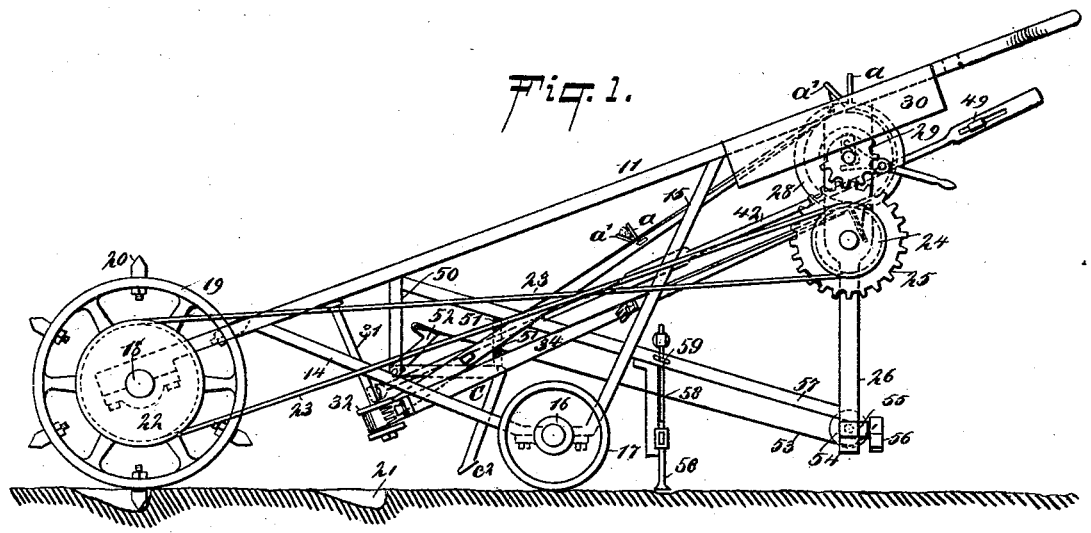

ROBERT BAPTIE ORMISTON, OF WINNIPEG, CANADA.

PLANTER.

SPECIFICATION forming part of Letters Patent No. 515,159, dated February 20, 1894.

Application filed April 29, 1893. Serial No. 472,357. (No model.)

*To all whom it may concern:*

Be it known that I, ROBERT BAPTIE ORMISTON, of Winnipeg, in the Province of Manitoba and Dominion of Canada, have invented a new and useful Improvement in Planters, of which the following is a full, clear, and exact description.

My invention relates to an improvement in planters, and it has for its object to provide a machine especially adapted for planting cabbage, celery, onions and like seed or plants, and to provide a means whereby as the planter advances, cavities will be made in the earth at suitable distances apart for the reception of the seed or plant, and whereby also the plants or seed will be delivered over the cavities, and whereby also a clutch capable of being manipulated by the attendant of the machine, will remove the seed or plant from the feed device and deposit it in its proper cavity.

A further object of the invention is to provide a means whereby pockets carried by the feed mechanism will automatically open and close at proper time to receive and drop the seed or plant carried thereby, and whereby also the roots of a plant placed in a cavity, or a seed dropped therein, may be expeditiously and properly covered.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of the machine. Fig. 2 is a plan view thereof. Fig. 3 is a detail sectional view of the gripping mechanism adapted for depositing an article to be planted in the ground, and likewise a detail sectional view of a portion of the feed mechanism, illustrating its relation to the gripping mechanism. Fig. 4 is a detail sectional view, illustrating the manner in which the pockets of the feed mechanism open and close. Fig. 5 is a detail view, illustrating the manner in which the gripping mechanism is pivoted. Fig. 6 is a detail view of the covering mechanism; and Fig. 7 is a detail view showing the attachment of the markers to their support.

The frame of the machine consists of two main parallel side beams 10 and 11, adapted to stand diagonally with respect to the ground, the beams having a downward inclination, and the said side beams may be connected by any number of cross bars, two being shown in the drawings and designated as 12 and 13, others having been omitted to disclose more properly the mechanism beneath them.

In addition to the side beams 10 and 11, an essentially triangular skeleton frame comprising two downwardly extending bars 14 and 15, is projected from both of the side bars, and each of the said triangular frames carries at its lower end an axle 16, upon which a supporting wheel 17, is loosely mounted, the said wheels being located at about the central portion of the machine.

Between the forward or lower ends of the side beams 10 and 11 a shaft 18 is journaled in suitable bearings, which shaft has secured upon it a wheel 19, said wheel being quite wide; and the wheel is provided upon its periphery at predetermined intervals with a series of blades 20, standing at a right angle to the periphery. The blades are located at about the central portion of the periphery of the wheel, and as the wheel revolves are adapted to produce cavities 21 in the earth, into which the plants are to be set or the seed placed, the distance that the blades are spaced regulating the distance between the cavities; and as the peripheral surface of the wheel is quite wide at each side of the blades, the wheel will smooth or compress the earth at each side of the cavity made therein. A rod or wire $21^a$, is located at the rear of the wheel 19, and the said wire or rod or bar is preferably connected with the beams 10 and 11 by means of springs, as shown in Fig. 2. The bar or rod $21^a$ is so placed that as the wheel turns the blades will be brought in engagement with the rod or bar and will be cleaned thereby, the springs permitting the rod or bar to yield sufficiently to follow the contour of the outer edge of the blades.

At the left-hand end of the shaft 18 a pulley 22, is secured, and this pulley is connected by a belt 23 with a pulley 24 of smaller diameter, which pulley is secured to a gear 25, the gear and pulley being mounted loosely upon a spud axle which is projected from a downwardly extending standard 26, secured to the left-hand beam 11 near the rear end. A parallel and similar standard is secured to the right-hand beam 10, and in these two standards a shaft 27, is journaled, which shaft carries at or near its center a pulley 28. The shaft 27, likewise carries at its left-hand end a pinion 29, the said pinion meshing with the gear 25. Adjacent to the shaft 27 a box 30, is secured upon the left-hand beam 11, in which box the seed or the plants to be planted may be placed.

Near the lower end of the left-hand beam 11 a short standard 31, is projected downwardly and slightly rearwardly, and the standard is provided with a foot 32, which extends inward beneath the two beams; and said foot is adapted as a bearing for the trunnions of a pulley 33, which pulley is vertically located, and is in alignment with the pulley 28 upon the rear shaft 27, the pulley 33 being of much less diameter than the rear pulley 28. These two pulleys are adapted to support and drive a feed belt 34, which belt is preferably crossed, as shown in Fig. 2.

I desire it to be understood that the gears 25 and 29, are so calculated that the feed or planting belt 34, will revolve at the same speed as the feed wheel 19. The feed or planting belt 34, is provided at intervals in its length with longitudinal openings 35, as shown in Figs. 3 and 4, and at one end of the openings an angular plate is secured to the belt, the said plate comprising a horizontal member 36, which is secured to the belt in any suitable or approved manner and extends slightly over an opening 35, and a second member 37, which is located at more or less of an obtuse angle to the belt. Immediately over the opening 35 near which the angular plate is attached, the horizontal or foot member 36, is provided with an opening 38, produced transversely therein; and in connection with the angular plate attached to the belt a second angular plate is employed, and to distinguish these two plates I denominate one a and the other $a'$, the plate $a$ being that which is secured to the belt. The plate $a'$, is likewise angular in construction, and is shaped substantially as the plate $a$, and the plate $a'$ is passed through the opening 38 in the plate $a$, and is pivoted in said opening, the pivotal point being at the junction of the two members. Therefore, one member will extend upward at an angle to the outer face of the belt, while the other member will extend within the opening 35 of the belt or below it. The inner member of the plate $a'$, is designated as 39, and the outer member as 40. The two members 37 and 40 of the two plates $a$ and $a'$ are made to face each other, and the two virtually constitute a pocket. The outer members of both of these plates are preferably made up of a series of teeth, and a spring 41, secured to the outer face of the attached member 36 of the plate $a$, has constant bearing against the outer member of the plate $a'$; and the tendency of this spring is to carry the said outer member of the plate $a'$ in contact with the corresponding member of the plate $a$, as shown in Fig. 4; but as the belt passes over either of the pulleys the inner member 39 of the plate $a'$, by engagement with the pulley will cause its outer member 40, to be carried away from the corresponding member of the plate $a$, and consequently present a V-shaped pocket, in which the plant to be set or the seed to be placed in the ground is to be located.

What I denominate as a planting bar 42, is pivotally attached to the right-hand skeleton frame, the fulcrum of the bar consisting of a pin 43, which is passed through a longitudinal opening 44, produced in the bar preferably between its center and its lower end; and the forward end of the bar is carried upward beneath and adjacent to the rear extremity of the beam 10, the rear portions of the two beams 10 and 11 being shaped to constitute handles, and the planting bar, is connected with the beam 10 near its handle end by means of a spring 45. The lower end of the planting bar, is provided with gripping fingers B, as shown in detail in Fig. 3. These gripping fingers are of substantially the same construction as the pockets of the feed or planting belt, and comprise an angular plate $b$, one end of which is secured in the planting bar, the other member extending inwardly in direction of the smaller pulley 33, over which the planting belt passes; and at the junction of the two members of the plate $b$ a slot 46, is made, in which the lower end of a straight plate $b'$, is pivoted, the plate $b'$, being adapted to engage with and be moved a distance from the inner member of the angular plate $b$. Normally the plate $b'$ and the inner member of the plate $b$, are held in contact by means of a plate 47, bearing against the back of the plate $b'$; and a cord 48, is attached to the said plate 47, which cord, as shown in Fig. 2, is connected at its rear end with a block 49, sliding in the handle end of the planting bar.

It will be understood that by reason of the loose pivotal connection of the planting bar with the frame of the machine, the bar may be moved forwardly or rearwardly, or up or down, and likewise it may be carried either to or from the planting belt. Ordinarily, however, the gripping fingers B of the planting bar are located opposite the lower or smaller pulley 33 of the planting belt.

The fingers B, are adapted to receive the plant or seed from the planting belt, and by the manipulation of the planting bar the seed or plant is deposited in a cavity 21 prepared for it in the ground. After the seed or plant has been placed in the ground, it is necessary that the roots of the plants shall be covered, or the seed entirely covered. This is accomplished by means of a covering bar C, shown in detail in Fig. 6, which covering bar is of angular construction, its horizontal member $c$, being pivotally connected with a standard 50, projected downward from the frame, the said standard being located opposite the blades on the wheel 19; and what may be termed the vertical member $c'$ of the covering bar extends forwardly and its lower end is provided with a shoe $c^2$. The covering bar is normally held at an elevation from the ground by means of a spring 51, attached preferably to the bar at the junction of its two members, and to a suitable fixed support upon the frame, as shown in both Figs. 1 and 6; and the covering bar is operated by attaching to it a crank lever 52 at its fulcrum, which crank lever has secured to it one end of a cord 53, and this cord is made to pass over a pulley 54, journaled upon a cross bar 55, connecting the lower ends of the side rear standards 26, which bar has also pivoted to it a foot lever 56; and the rear end of the cord 53, is secured to the said lever 56, as shown in Fig. 2. Thus whenever the foot lever 56, is pressed downward, the covering bar will be carried to an engagement with the ground and may be held in such engagement for any desired length of time. The lower cross bar 55 is supported or braced by a brace bar 57 which extends upward to the main frame.

In the operation of the machine, as it is pushed forward or drawn forward, the bladed wheel 19, produces cavities in the ground at intervals apart, and as the planting belt travels upward upon the rear pulley 28, its pockets open and the seed or plant to be planted or set is placed in the pockets as they present themselves. The jaws of the pockets clamp the seed or plant as shown in Fig. 2, and the contents of the pockets are carried forwardly and downwardly with the planting belt, and the moment that the pockets reach and commence to turn around the lower pulley 33 over which the belt passes, the planting bar is manipulated first by opening its fingers $b$ and $b'$, and next by carrying the fingers toward the planting belt in such manner that the seed or plant will be grasped as it leaves a pocket upon the belt. The planting bar is next manipulated in a manner to carry its gripping fingers downward and deposit the seed or plant in a cavity 21. Next as the cover bar approaches the cavity in which the seed or plant has been placed it is lowered by pressing upon the foot lever 56, and thereby the root of the plant or the seed planted, is covered.

The machine is exceedingly simple and durable, economic in its construction, and capable of being readily manipulated.

A marker 58 is located at each side of the brace bar 57, which markers when not in use are held in an upper position by a supporting rail 59, also secured upon the bar.

The markers are enlarged at their inner ends and are preferably held in place by the same pivot pin, and are prevented from dropping too far downward, by connecting the inner enlarged portions of each marker by a strap 60, with a stud 61, located upon the bar, or equivalent devices may be employed.

Having thus described my invention, I claim as new and desire to secure by Letters Patent—

1. The combination, with the advance wheel having radial blades and the beams wherein the same is journaled, of a cleaning rod extending transversely across the path of travel of the blades, and springs secured to the rod and to the beams, as and for the purpose set forth.

2. In a planter, a planting belt provided with pockets, said pockets comprising two jaws, one being rigidly secured to the belt, and the other spring-controlled, as and for the purpose specified.

3. In a planter, the combination, with a planting belt and the pulleys over which it passes, the belt being provided with openings produced at intervals therein, of a series of pockets located upon the belt, one adjacent to each opening said pockets comprising two angular jaws, one member of one jaw being secured to the belt adjacent to an opening, the other jaw being pivoted in the fixed jaw, one member of the pivoted jaw extending within the opening of the belt and the other member having a spring controlling it, whereby when the belt passes over a pulley the jaws will be in engagement, and as the belt is passing over the pulley the jaws are opened, as and for the purpose specified.

4. In a planter, the combination, with a belt and pulleys over which it passes, of pockets carried by the belt, said pockets comprising jaws, one of which is spring-controlled, and one of the jaws being provided with an extension to be operated upon by the pulley to open the said jaw, as and for the purpose set forth.

5. In a planter, a planting bar loosely pivoted upon a fixed support and capable of lateral and vertical movement, a spring-controlled jaw carried by the planting bar, and a means, substantially as shown and described, for operating the said jaw, as and for the purpose set forth.

6. In a planter, a planting belt provided with a series of pockets comprising opposing jaws and devices for opening and closing the same, of a planting bar capable of vertical and lateral movement, the said planting bar being provided with gripping jaws located opposite the belt, and an opening mechanism connected with the gripping jaws of the planting bar, as and for the purpose specified.

7. In a planter, a planting belt provided with a series of pockets comprising opposing jaws and devices for opening and closing the same, of a planting bar capable of vertical and lateral movement, the said planting bar being provided with gripping jaws located opposite the belt, an opening mechanism connected with the gripping jaws of the planting bar, a cover bar extending downwardly beneath the belt at the rear of its delivery end, and a compression lever connected with the covering bar, substantially as shown and described.

ROBERT BAPTIE ORMISTON.

Witnesses:
H. S. PALK,
PAUL BRYGRAN.